July 8, 1952     S. DIAMOND     2,602,253
DEVICE FOR VIEWING TRANSPARENT PHOTOGRAPHS
Filed Feb. 20, 1948
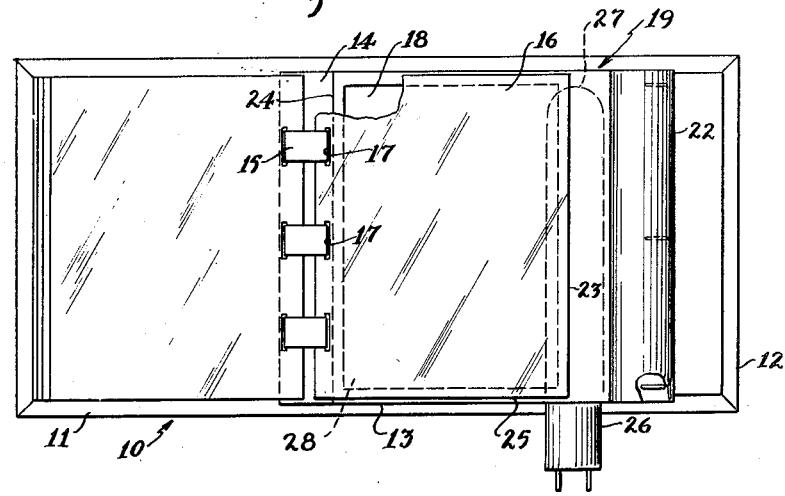
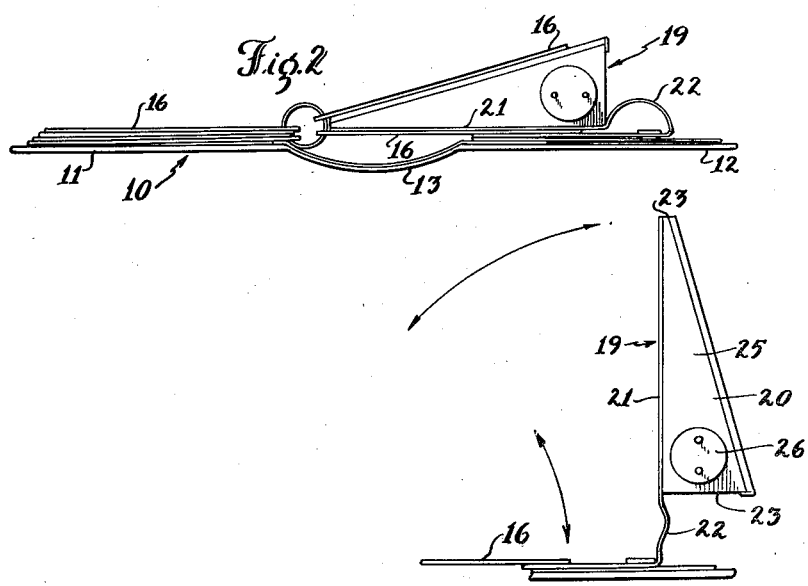
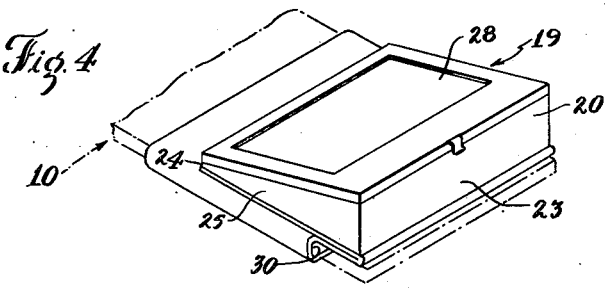
INVENTOR.
Samuel Diamond
BY
ATTORNEY Patented July 8, 1952

2,602,253

UNITED STATES PATENT OFFICE 2,602,253

DEVICE FOR VIEWING TRANSPARENT PHOTOGRAPHS

Samuel Diamond, New York, N. Y.

Application February 20, 1948, Serial No. 9,851

5 Claims. (Cl. 40—132)

The present invention relates to a device for keeping and viewing transparent photographs, both black and white and colored, and photographic negatives.

It is an object of the present invention to provide a device of the character described in which a number of the transparent photographs may be conveniently and safely kept and in which each of them may be easily and conveniently individually viewed at will, without removal therefrom.

It is also an object of the present invention to provide photograph viewing devices of the character described which permit the viewing of the photographs with a minimum of effort and maximum ease and convenience under most favorable light conditions, to obtain a clear, bright and accurate view of the photographed objects.

It is still another object of the present invention to provide a device of the character described which is compact and conveniently portable and in which the photographs are individually and collectively removable and replaceable.

It is a still further object of the present invention to provide a device of the character described which is of simple construction; which is sturdy and durable; which is economical to produce; and which is simple and easy as well as convenient to use.

In the drawings:

Fig. 1 is a top plan view of a device of the present invention, shown open for use;

Fig. 2 is an edge view of the same;

Fig. 3 is a fragmentary edge view of the same device, shown with the viewing member lifted for rearrangement of photographs; and Fig. 4 is a fragmentary perspective view of a modified embodiment of the device of the invention wherein the viewing member is separable from the photograph holding member.

Referring more specifically to the accompanying drawings, the device of the present invention comprises a loose-leaf, album-like, photograph holding member, generally designated as 10, having the preferably stiff covers 11 and 12, the flexible connecting back 13, and the loose-leaf ring binds 14 having the rings 15, and secured to the back 13, preferably off center thereof and closer to one of the covers, such as 11. A plurality of transparent, photograph holding, open ended envelopes 16 are removably held on the rings 15, by suitable apertures formed along one of their edges, as at 17. Or, if desired, the photographs 18 may be directly engaged upon the rings 15, by having such ring engaging openings formed directly in the photographs.

Secured to the other cover 12 of the album 10 is a photograph viewing device, generally designated as 19, consisting of a wedge shaped, open ended box 20 having a stiff base 21, which is connected by a preferably flexible spacing connection 22 to the cover 12, a relatively wide outer wall 23, a relatively narrow inner wall 24, and wedge shaped end walls 25. An electric light socket 26, having means for connection into an electric circuit, is arranged within the viewer 19, and set either into the wall 23, or one of the walls 25, as may be desired, which socket is adapted to receive a suitable light bulb 27.

The box 20 is provided with a transparent cover 28 having light diffusing and filtering characteristics most suitable for the proper viewing of transparent colored photographs over the light of the bulb 27. Such cover may comprise blue tinted glass or an opalescent plastic sheet, with or without an accompanying colored light filter, in a manner which will be readily understood by those skilled in the art. The cover 28 may be hingedly secured to one of the walls of the box 20, such as the wall 23, to permit its opening for the purpose of inserting and replacing the bulb 27.

In operation, transparent photographs 18 are inserted into the transparent envelopes 16 or similar suitable holders, which are mounted on the rings 15 in book leaf fashion. The photograph holding envelopes 16 are then turned to lie on the cover 11, and the viewer 19 is disposed on the cover 12 with its thin edge inwardly directed, toward the album back 13. The light 27 is connected into an electric circuit and turned on and the photographs turned over on the transparent cover 28 of the viewer 19, one by one. When any one of the photographs 18 has been inspected and is no longer wanted to be looked on it may either be turned back on the cover 11 or it may be inserted under the viewer 19 as illustrated in Fig. 1, depending on whether the next photograph to be viewed is one side thereof or the other; the flexible viewer connection 22 permitting the upending of the viewer 19, and providing space thereunder for a number of the photographs 18 and their holders 16.

In the embodiment of Fig. 4, the viewer 19 instead of being secured directly and fixedly to the cover 12 may have at the end of the flexible connection 22 a sleeve 30, which is adapted to receive therewithin and to fit over the cover 12, so that the same viewer may be used with any number of suitably sized albums 10.

It will also be apparent that many modifications and variations of the device of the present invention may be made by any one skilled in the art, in accordance with the principles of the invention hereinabove set forth and without the use of any inventive ingenuity. I desire, therefore, to be protected for any and all such modifications and variations that may be made within the spirit of the invention and within the scope of the claims hereto appended.

What I claim is:

1. Apparatus for viewing transparent photographs or the like, comprising a photograph holding member, including a pair of relatively rigid covers flexibly connected at one of their edges in spaced relation to one another and means between said covers for hingedly engaging the edge of photograph holding means, and a viewing member including an open ended rectangular housing of wedge shaped cross-section, means for holding an electric light secured in said housing and a light transmitting cover secured over the open end of said housing, said housing having its wider side connected by flexible means of substantial width to an edge of said cover in position to have its thinner side disposed between said covers whereby photographs may be disposed above and below said housing between it and each of said covers.

2. A viewing device of the character described comprising a substantially open-top, rectangular housing, said housing having a bottom, a relatively wide side wall, a relatively narrow side wall and wedge shaped end walls, said housing having means for holding an electric light bulb therewithin and means for connecting said light bulb in an electric circuit, a light transmitting cover for the open top of said housing and flexible connecting and spacing means secured to the bottom of said housing at one of its wider walls, whereby it may be connected to an edge of an album cover.

3. The combination of a viewing device of claim 2 with an album having a pair of spaced flexibly connected outer cover and means intermediate said covers for hingedly supporting a plurality of transparent photographs adjacent one of their edges.

4. The viewing device of claim 2, wherein the said connecting means includes a sleeve adapted to fit over an album cover.

5. Apparatus for viewing transparent photographs or the like, comprising a photograph holding member, including a pair of relatively rigid covers flexibly connected at one of their edges in spaced relation to one another and means between said covers for hingedly engaging the edge of a photo-holding means and a viewing member removably and flexibly connected to one of said covers adjacent a free edge thereof in position to be interposed between said covers, said viewing member including an open ended rectangular housing of wedge shaped cross-section, means for holding an electric light secured within said housing and a light transmitting cover secured over the open end of said housing, said housing having a sleeve adapted to fit over one of said covers flexibly secured to the wider side thereof removably fitted over said cover in position to have the thinner side of said housing disposed between said covers.

SAMUEL DIAMOND.

REFERENCES CITED

The following references are of record in the file of this patent:

UNITED STATES PATENTS

| Number | Name | Date |
|---|---|---|
| 589,372 | Brown | Aug. 31, 1897 |
| 1,130,333 | Plushkell | Mar. 2, 1915 |
| 2,227,898 | Grant | Jan. 7, 1941 |

FOREIGN PATENTS

| Number | Country | Date |
|---|---|---|
| 123,245 | Switzerland | Nov. 1, 1927 |
| 231,872 | Germany | Mar. 2, 1911 |
| 500,226 | Great Britain | Feb. 6, 1939 |
| 521,337 | Great Britain | May 17, 1940 |